(12) United States Patent
Chen et al.

(10) Patent No.: US 9,161,078 B2
(45) Date of Patent: Oct. 13, 2015

(54) METHODS AND APPARATUS FOR REDUCING TUNE-TIME DELAY IN A TELEVISION APPLIANCE WITH PERSONAL VERSATILE RECORDER CAPABILITIES

(75) Inventors: Kun-Pei Chen, San Diego, CA (US); Joseph Mehr, North Wales, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 3786 days.

(21) Appl. No.: 10/219,045

(22) Filed: Aug. 14, 2002
(Under 37 CFR 1.47)

(65) Prior Publication Data
US 2004/0033053 A1    Feb. 19, 2004

(51) Int. Cl.
| | |
|---|---|
| H04N 5/783 | (2006.01) |
| H04N 9/80 | (2006.01) |
| H04N 21/4147 | (2011.01) |
| H04N 5/76 | (2006.01) |
| H04N 21/433 | (2011.01) |
| H04N 21/438 | (2011.01) |
| H04N 5/781 | (2006.01) |
| H04N 5/782 | (2006.01) |
| H04N 5/85 | (2006.01) |

(52) U.S. Cl.
CPC ............. *H04N 21/4147* (2013.01); *H04N 5/76* (2013.01); *H04N 21/4331* (2013.01); *H04N 21/4384* (2013.01); *H04N 5/781* (2013.01); *H04N 5/782* (2013.01); *H04N 5/783* (2013.01); *H04N 5/85* (2013.01)

(58) Field of Classification Search
USPC ............... 386/1, 45, 46, 52, 68, 83, 109, 125, 386/126, 111, 112; 360/13
See application file for complete search history.

(56) References Cited

U.S. PATENT DOCUMENTS

| | | | | |
|---|---|---|---|---|
| 5,438,423 | A * | 8/1995 | Lynch et al. | 386/109 |
| 5,701,383 | A * | 12/1997 | Russo et al. | 386/46 |
| 5,706,388 | A * | 1/1998 | Isaka | 386/125 |
| 5,887,111 | A * | 3/1999 | Takahashi et al. | 386/326 |
| 5,930,444 | A * | 7/1999 | Camhi et al. | 386/46 |
| 5,999,691 | A * | 12/1999 | Takagi et al. | 386/337 |
| 6,233,389 | B1 | 5/2001 | Barton et al. | |
| 6,289,169 | B1 * | 9/2001 | Okuyama | 386/83 |
| 6,324,338 | B1 | 11/2001 | Wood et al. | |
| 6,453,115 | B1 * | 9/2002 | Boyle | 386/68 |
| 6,542,695 | B1 | 4/2003 | Akiba et al. | |
| 2001/0002224 | A1 | 5/2001 | Sasaki et al. | |
| 2001/0014203 | A1 | 8/2001 | Ito et al. | |

FOREIGN PATENT DOCUMENTS

| | | |
|---|---|---|
| EP | 1 143 719 | 10/2001 |
| JP | 11 112925 | 4/1999 |

\* cited by examiner

*Primary Examiner* — Hung Dang
(74) *Attorney, Agent, or Firm* — Lori Anne D. Swanson

(57) ABSTRACT

Apparatus and methods for reducing the tune-time delay in a television appliance having a PVR subsystem are provided. A first signal path provides a desired television signal for display without a PVR associated tune-time delay. The first signal path includes a first buffer for buffering the television signal and a decoder for decoding the buffered television signal for display. The second signal path includes a storage device for storing a copy of the buffered television signal, and a second buffer for buffering the stored television signal when a trick play mode is selected. The decoder decodes the buffered television signal to provide the requested trick play mode. A switch is provided under control of the processor for switching between display of the television signal via the first path and display of the trick play mode via the second path.

52 Claims, 3 Drawing Sheets

METHODS AND APPARATUS FOR REDUCING TUNE-TIME DELAY IN A TELEVISION APPLIANCE WITH PERSONAL VERSATILE RECORDER CAPABILITIES

BACKGROUND OF THE INVENTION

The present invention relates to the field of multi-media recording and playback. More specifically, the present invention relates to reducing tune-time delay in a personal versatile recorder subsystem of a television appliance.

Cable and satellite television systems are capable of providing a viewer with hundreds of channels of television programming. Such an abundance of programming often creates difficult viewing choices for a viewer when two programs that the viewer would like to watch are broadcast simultaneously. In addition, a viewer may like to record for later viewing a program which is broadcast at an inconvenient time.

These problems were first overcome by recording devices such as the video cassette recorder (VCR). A VCR allows a viewer to record incoming audiovisual programming while viewing a different channel. A VCR also allows a viewer to record programming while the viewer is unavailable to watch the programming by presetting program times into the VCR. Thus the VCR allows a viewer to record and view programming that the viewer would otherwise not be able to view.

The VCR concept has been expanded in recent years to include digital compression devices that provide additional features for managing the reception and recording of analog audiovisual programming. Such products have been given various names, such as personal video recorders, video recording computers, and personal television servers (hereinafter "personal video recorders"). Current examples of personal video recorders include the TiVo® system made by TiVo, Inc. and the ReplayTV® system made by Replay Networks, Inc. Personal video recorders replace the conventional VCR magnetic tape recording medium with a computer hard drive internal to the recorder. The personal video recorder is connected between a viewer's television set and set-top terminal, satellite receiver, or antenna. The personal video recorder can control the channel tuned on the television, provide an interactive electronic program guide, and record programming on a manual, external signal responsive, or timer controlled basis. Additionally, the personal video recorder can buffer incoming audiovisual programming to enable a viewer to pause or replay a portion of a live television program, so long as the pause or replay does not exceed the capacity of the buffer. The personal video recorder can alternatively be built into the set-top terminal or the television, instead of comprising a separate stand-alone box.

However, the prior art personal video recorder does not have the capability to store and replay other types of media, including Internet data files such as web pages, MP3 files, JPEG files, bit map files, and the like. In addition, the prior art personal video recorder does not have the capability to store, retrieve and replay streamed audiovisual digital programming content from the Internet or other caching servers.

The personal versatile recorder (PVR) developed by General Instrument Corporation of Horsham, Pa., the assignee of the present invention, overcomes the disadvantages of the prior art personal video recorders. One implementation of a PVR is described in U.S. patent application Ser. No. 09/520,968, filed on Mar. 8, 2000, entitled "Personal Versatile Recorder and Method of Implementing and Using Same." The PVR enables the receipt, recording, retrieval and playback of a variety of types of data or data files on a hard drive, including but not limited to digital and analog audiovisual programming, streaming media, picture files, video files, audio files, Hypertext Markup Language (HTML) files, and various types of Internet multimedia content.

In a typical PVR application, the incoming analog video is converted into MPEG format and the resulting digital data is routed through the hard disk drive of the PVR in order to enable any "trick play" modes such as instant replay, slow play, rewind, or pause. However, due to the bursty nature of the hard disk drive transfers, buffers are required at both the read and write ports of the hard disk drive. The resultant latency through both buffers and the hard disk may be as much as two seconds. Such a delay occurs each time a new channel is tuned and is apparent to the consumer. Where a digital channel is used as the input, the PVR delay will be added to the tuning delay, also resulting in an intolerable delay for each channel change. If the PVR delay is eliminated by bypassing the PVR subsystem, the input video is not capable of being recorded and the trick play modes will not be enabled. Additionally, for an analog input signal, in addition to the extra delay, a degradation in the lossy compression of the MPEG encoder and decoder in the PVR subsystem impairs the picture quality.

It would be advantageous to provide methods and apparatus which reduce the tune-time delay associated with the PVR subsystem, while still enabling trick play modes. It would also be advantageous to provide improved quality of analog channels. Further, it would be advantageous to optimize the most common use mode of the television appliance so that the PVR subsystem may be available to perform other tasks, such as video scaling, graphics, DOCSIS modem data processing, and the like.

The methods and apparatus of the present invention provide the foregoing and other advantages.

SUMMARY OF THE INVENTION

The present invention provides apparatus and methods for reducing the tune-time delay in a television appliance having a PVR subsystem. In particular, the present invention provides a low latency path direct from the video input to the display. This results in a reduced tune-time delay as compared to systems where the video input is first routed through the hard drive prior to display to accommodate PVR trick play modes. In addition, such a low latency path also provides improved video quality for the "normal" viewing mode. As a result, tuning response time is improved during "channel surfing", while at the same time, bus bandwidth, hard disk bandwidth, and memory bandwidth and memory size are reduced compared to that of standard PVR systems.

A first signal path (the low latency path) provides a desired television signal for display without a PVR associated tune-time delay. A processor is adapted to receive and process the desired television signal for PVR trick play mode use via a second signal path. A switch is operatively associated with the processor for switching between the display of the desired television signal via the first path and display of a trick play mode via the second path based on markers in the desired television signal.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

The present invention provides apparatus and methods for reducing the tune-time delay in a television appliance having a PVR subsystem. In particular, the present invention provides a low latency path direct from the video input to the display. This results in a reduced tune-time delay as compared to systems where the video input is first routed through the hard drive prior to display to accommodate PVR trick play modes. In addition, such a low latency path also provides improved video quality for the "normal" viewing mode. As a result, tuning response time is improved during "channel surfing", while at the same time, bus bandwidth, hard disk bandwidth, and memory bandwidth and memory size are reduced compared to that of standard PVR systems.

Figure 1:
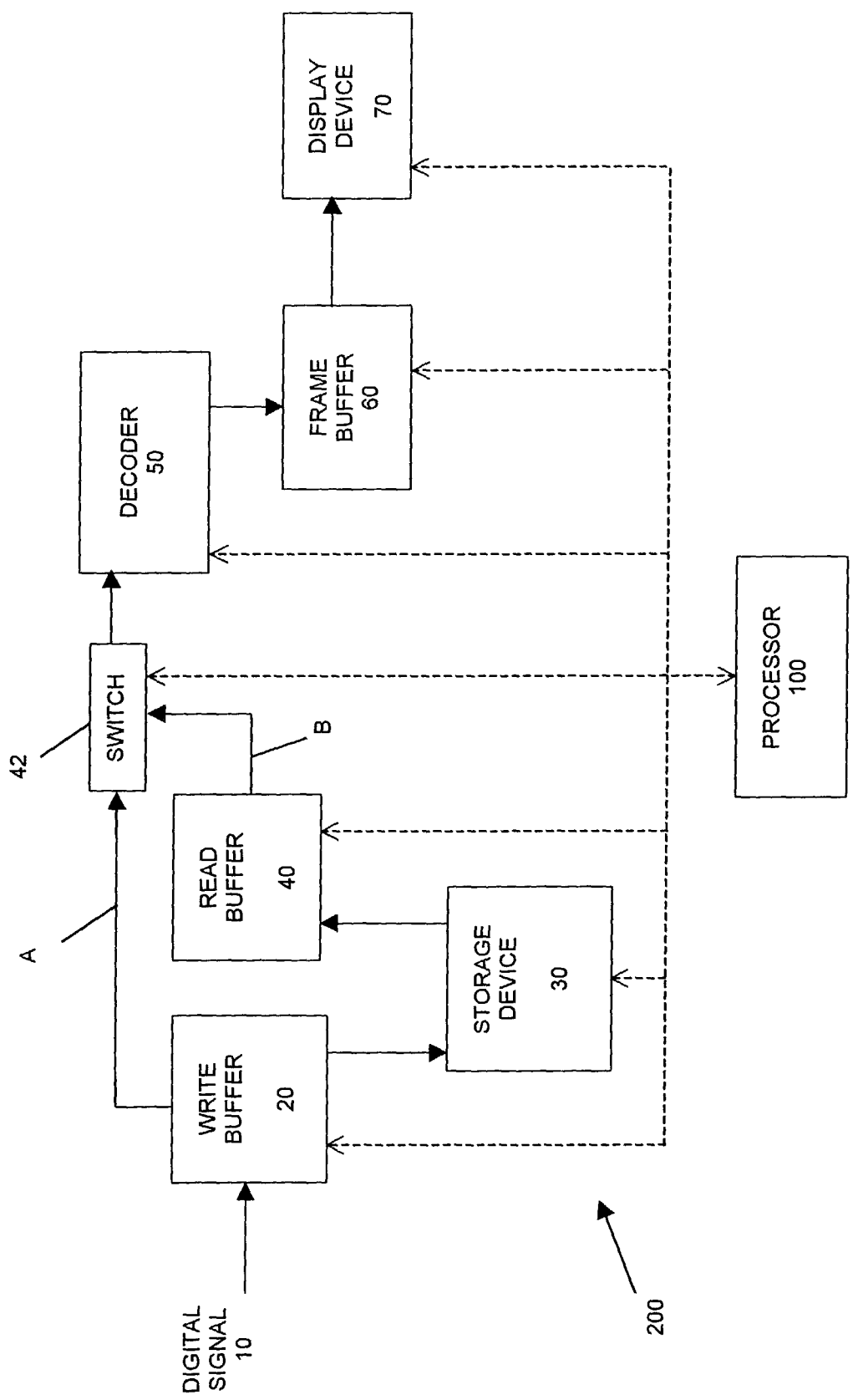
FIG. 1 shows a block diagram of an example embodiment of the invention.

In an exemplary embodiment of the invention as shown in FIG. 1, methods and apparatus for reducing tune-time delay for television signals in a television appliance 200 having personal versatile recorder (PVR) capabilities is provided. A desired television signal 10 is received and obtained at a receiver/tuner (not shown) of a television appliance 200 in a known manner. A first signal path A provides the desired television signal 10 for display without a PVR associated tune-time delay. The desired television signal is also processed along a second signal path B for PVR trick play mode use. A processor 100 is responsive to markers inserted in the desired television signal for providing PVR trick play mode use via the second signal path B. A switch 42 is operatively associated with the processor 100 for switching between the display of the desired television signal 10 via the first path A and display of a trick play mode via the second path B. In FIG. 1, the processor control signals travel over the dashed lines to and/or from each of the other system components.

It should be noted that the first signal path A denotes the low latency path for "live" or "normal" television viewing without involvement of the PVR subsystem. The second signal path B is the path through the PVR subsystem which provides trick play mode capability. These designations are used consistently throughout the description of the various embodiments of the invention.

In one embodiment as shown in FIG. 1, the desired television signal 10 comprises a digital television signal. In the digital embodiment, the first signal path A includes a first buffer 20 (write buffer) for buffering the digital television signal and a decoder 50 for decoding the buffered digital television signal for display. The second signal path B includes a storage device 30 for storing a copy of the buffered digital television signal, and a second buffer 40 (read buffer) for buffering the stored television signal when a trick play mode is selected. The decoder 50 decodes the buffered television signal to provide the requested trick play mode. A frame buffer 60 is provided to buffer the television signal prior to display by display device 70.

In the digital case, markers may be inserted in the desired signal 10 during encoding of the signal prior to transmission. Alternately, the markers may be inserted in the television signal 10 under control of the processor 100 at the television appliance. Although various techniques exist for allowing the processor 100 to insert such markers, one option would be to provide a multiplexer as part of switch 42. The multiplexer would receive the marker data from processor 100 and combine this data with the digital signal 10 received by switch 42. Other techniques for enabling such marking will be apparent to those skilled in the art. Processor 100 could also be implemented to read data embedded in the digital signal 10 via the decoder 50, directly from the digital signal itself, and/or via an interface (not shown) which couples the digital signal 10 to the processor 100.

In order to switch from the display of the television signal 10 via the first path A (i.e. "normal" display) to display of the trick play mode via the second path B (i.e. PVR display), the processor 100 determines a trick play mode start location in the digital television signal 10 corresponding to a start of a requested trick play mode based on at least one of the markers. The second buffer 40 accesses the storage device 30 such that the buffering of the stored television signal begins at the determined trick play mode start location. The decoder 50 ends decoding of the television signal 10 from the first path A at the determined trick play mode start location. Switch 42 is then switched from the first signal path A to the second signal path B so that the decoder 50 can then begin decoding of the buffered television signal from the second path B at the determined trick play mode start location.

Those skilled in the art will appreciate that processor 100 controls the buffers 20 and 40, the storage device 30, the switch 42, the decoder 50, the frame buffer 60, and the display 70. In addition, although a single processor 100 is shown as controlling the components of FIG. 1, it should be appreciated that multiple processors in communication with one another may be used to implement the invention, and that a single processor 100 is shown for ease of explanation only.

In order to switch from trick play mode display from the second path B to display of the television signal from the first path A (i.e. switching from PVR trick play mode to normal mode) the processor 100 determines a trick play mode end location in the digital television signal 10 corresponding to an end of a requested trick play mode based on at least one of the markers. Switch 42 is then switched from the second signal path B to the first signal path A and the decoder 50 can then begin decoding of the buffered television signal from the first path A at the determined trick play mode end location. Thus, prior to and after trick play mode, the decoder 50 will decode the buffered television signal from the first path A. During trick play mode, however, the decoder 50 will decode the buffered television signal from the second path B.

The trick play mode may comprise a jump-base trick play mode, such as fast backward, jump backward, or rewind. The trick play mode may also comprise a non-jump based trick play mode, such as pause or slow motion. Those skilled in the art will appreciate that PVR trick play modes such as fast forward and jump forward are not possible when switching from "live" or "normal" viewing to PVR mode.

Where the trick play mode comprises a non-jump-based trick play mode (e.g., pause, slow motion), in order to switch from the display of the television signal 10 via the first path A to display of the trick play mode via the second path B, the decoder 50 completes decoding of a current segment of the digital television signal from the first path A. The decoder 50 then decodes a next segment of the television signal from the first path A. Switch 42 is then switched from the first signal path A to the second signal path B, and the decoder 50 next decodes from the second path successive segments of the digital data which follow the next segment of digital data from the first path A.

In the digital embodiment, when transitioning from trick play mode to normal viewing, the current position of the television signal in the trick play mode may not be near the time of the live stream, requiring a "jump" from the current PVR position to the live input stream. In this case, in order to switch from trick play mode display from the second path B to display of the television signal from the first path A, the decoder 50 may hold a last decoded frame from the second path B in a frame buffer 60 and decode the next frame from the first path A. The display 70 can then display the television signal from the first path A.

Alternatively, when transitioning from trick play mode to normal viewing, the position of the television signal in the trick play mode may approach the time of the live stream. In this case, in order to switch from trick play mode display from the second path B to display of the television signal from the first path A, the processor 100 determines when a point in the digital television signal providing the trick play mode approaches a corresponding point at which the buffered television signal is being stored based on at least one of the markers. The decoder 50 holds a last decoded frame from the second path B in a frame buffer 60 when the point in the digital television signal is at a predetermined distance from the corresponding point at which the buffered television signal is being stored. Switch 42 is then switched from the second path B to the first path A. The decoder 50 then decodes the next frame from the first path A. The display 70 can then display the television signal from the first path.

Figure 2:
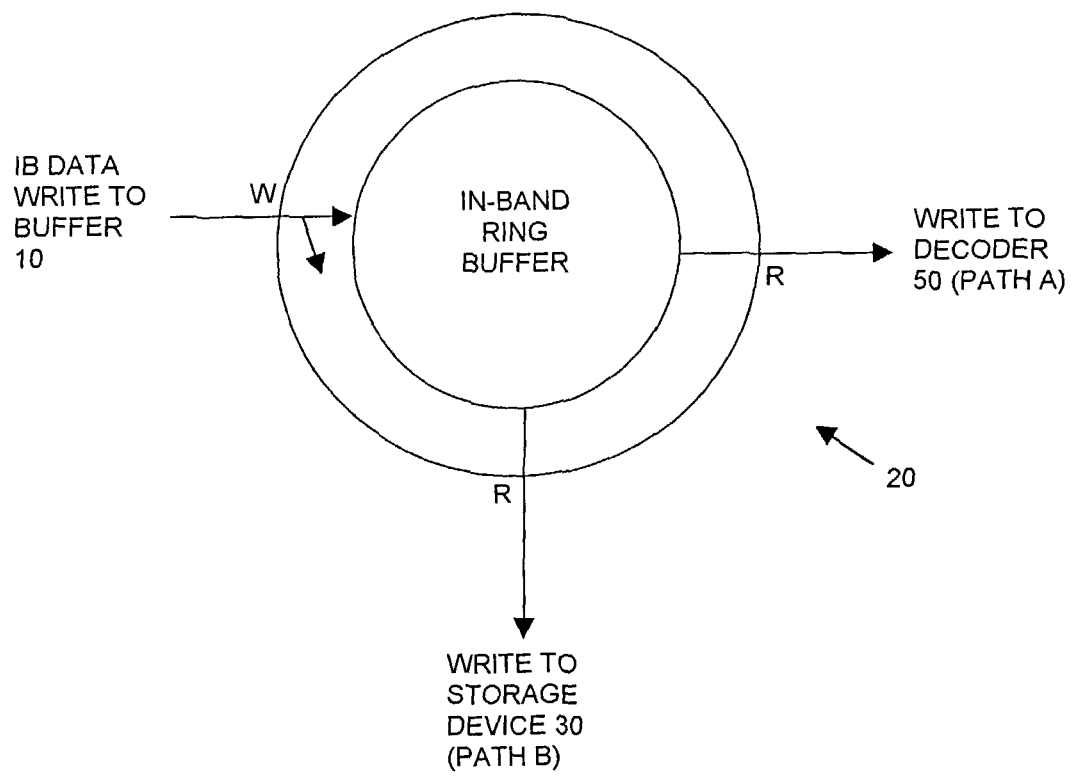
FIG. 2 shows a diagram of a ring buffer used in an example implementation of the invention.

As shown in FIG. 2, buffer 20 may comprise a ring buffer. The buffer 20 receives the in-band signal (e.g., the desired television signal 10) in a conventional manner. In conventional PVR systems the PVR subsystem simply records the data onto the hard drive. In order to do so, buffering may be required at the input and output of the PVR hard drive, for example in the case of an MPEG input, where the data is a constant stream of serial bits and the hard drive accepts 16 bit wide parallel data in multi-sector bursts. In a typical PVR system, when the user is in "live" mode (i.e. watching real time television) the PVR system maintains a real time copy of the program on the hard drive so that trick play modes like instant replay and rewind are possible. In such a case, the incoming data stream is buffered, written to the hard drive, read back from the hard drive, buffered again, and then decoded for display. The path the data takes through the PVR system delays the display by approximately one to two seconds.

In contrast, the present invention reads the input data 10 from the ring buffer 20 twice. Data is read from the buffer 20 for direct display via the first path A without delay, for normal viewing of a live or real time television program. Data is also read from buffer 20 for storage at storage device 30 via the second path B, for provision of PVR trick play modes. Once the system is operating in trick play mode, channel surfing is not possible and the delay is not observable while displaying trick play video. Therefore, there is no disadvantage to the present invention while performing trick play modes.

The output of the ring buffer 20 on the first path A (the low latency path) allows for immediate decoding and display of the television signal. When the first path A is selected at switch 42, no data is being read from the storage device 30 and bandwidth is freed up in the processor, the processor bus, and the storage device. Memory can therefore be dynamically re-allocated as the read buffer (buffer 40) is not being used.

Figure 3:
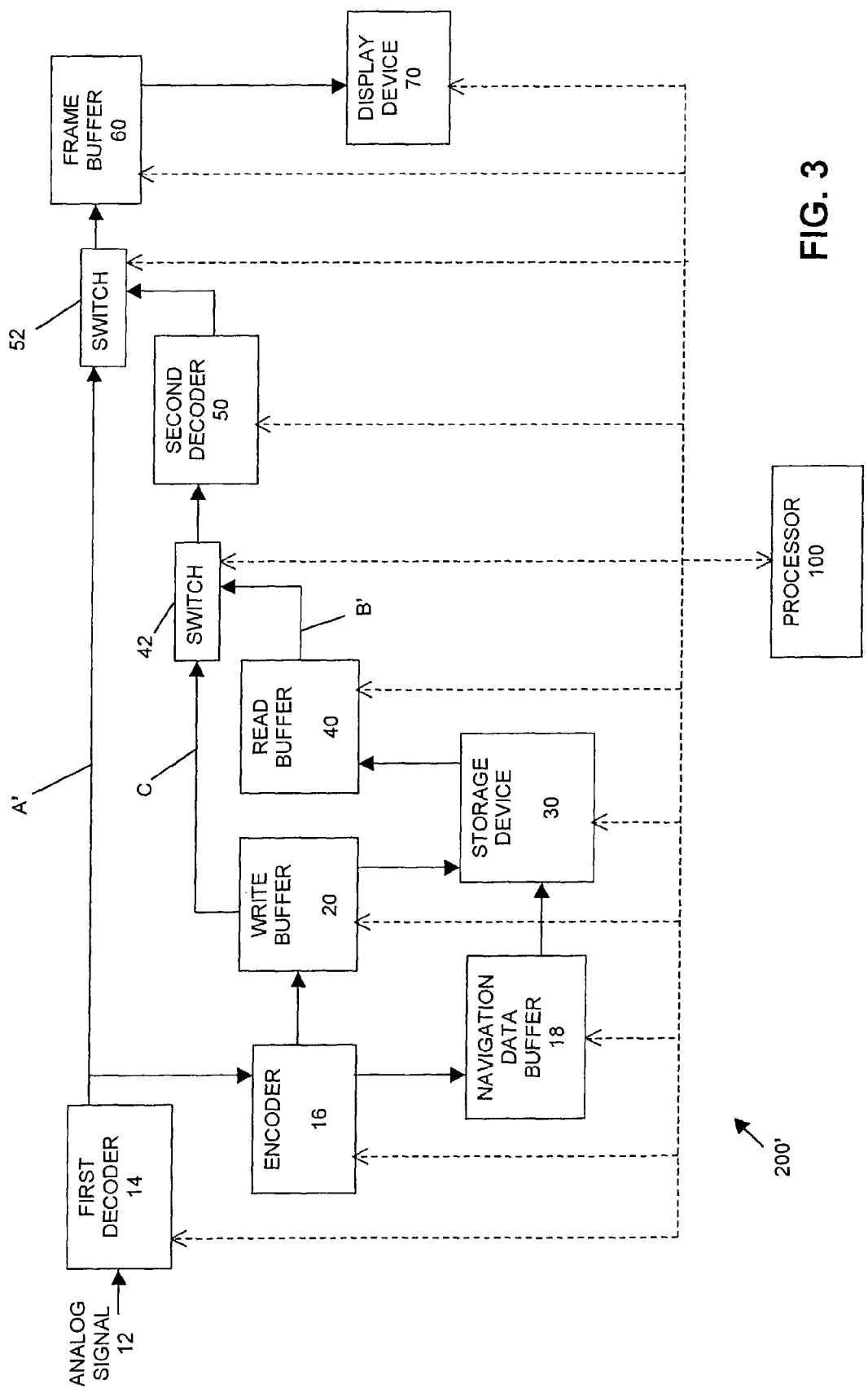
FIG. 3 shows a block diagram of a further example embodiment of the invention.

In an alternate embodiment of the invention as shown in FIG. 3, the desired television signal may comprise an analog television signal 12. In the analog case, the television appliance 200' includes a first signal path A' having a video decoder (first decoder 14) for decoding the analog television signal 12 and providing a digital data stream. A frame buffer 60 is provided for buffering the digital data stream prior to display by display device 70. The digital data stream can then be output from the frame buffer 60 for display. The second signal path B' includes an encoder 16 for encoding the digital data stream from the first decoder 14. For example, encoder 16 can be an MPEG encoder. A first buffer 20 (write buffer) is provided in the second signal path B' for buffering the encoded digital data stream for storage. A storage device 30 is provided for storing the buffered encoded data stream. A second buffer 40 (read buffer) in the second signal path B' is provided for buffering the stored encoded data stream when a trick play mode is selected. A second decoder 50 (e.g., an MPEG decoder) is provided for decoding the buffered data stream to provide the trick play mode.

Those skilled in the art will appreciate that processor 100 controls the buffers 20 and 40, the storage device 30, the switches 42 and 52, the encoder 16, the decoders 14 and 50, the navigation data buffer 18, the frame buffer 60, and the display 70. In addition, although a single processor 100 is shown as controlling the components of FIG. 3, it should be appreciated that multiple processors in communication with one another may be used to implement the invention, and that a single processor 100 is shown for ease of explanation only.

In the analog embodiment, in order to switch from the display of the television signal via the first path A' to display of the trick play mode via the second path B', the processor 100 determines a trick play mode start location in the digital data stream corresponding to a start of a requested trick play mode based on at least one marker carried in the data stream. The second buffer 40 accesses the stored copy of the television signal at the determined trick play mode start location such that the buffering of the stored television signal at the second buffer 40 begins at the determined trick play mode start location. Input to the frame buffer 60 is switched (e.g., at switch 52) from the first path A' at the determined trick play mode start location to the second path B'. At that point, the second decoder 50 begins decoding of the buffered television signal from the second path B' at the determined trick play mode start location.

In order to switch from trick play mode display from the second path B' to display of the television signal from the first path A', the processor 100 determines a trick play mode end location in the digital data stream corresponding to an end of a requested trick play mode based on at least one of the markers. The second buffer 40 accesses the decoded digital data stream from the first path A' at the determined trick play mode end location. The second decoder 50 ends decoding of the digital data stream from the second path B' at the determined trick play mode end location. Input to the frame buffer 60 is then switched (e.g., at switch 52) from the second path B' at the determined trick play mode end location to the first path A'.

As in the digital embodiment, the trick play mode may comprise a jump based trick play mode, such as fast backward, jump backward, or rewind. Alternatively, the trick play mode may comprise a non-jump based trick play mode such as pause or slow motion.

A third signal path C may be provided for the digital data stream from the first buffer 20 to the second decoder 50 to enable non-jump based trick play modes. In such a case, in order to switch from the display of the television signal 12 via the first path A' to display of the trick play mode via one of the second path B' or the third path C, the processor 100 marks the current frame position of the digital data stream during the encoding at the encoder 16. Switch 52 enables switching between the first path A' and the second and third paths B' and C. The second decoder 50 accesses the digital data stream at the marked position from one of the second path B' or the third path C via switch 42 for trick play mode display, depending on the trick play mode requested.

For example, where a non-jump based trick play mode comprises slow motion, the digital data stream 12 may be accessed at the marked position from the third path C to provide a next frame in the digital data stream, and successive frames following the next frame are provided via the second path B' during slow motion display.

When the non-jump-based trick play mode comprises pause, a frame located at the marked position is buffered at the second buffer 40 to provide for delayed playback at the termination of pause.

A navigation data buffer 18 may be provided for buffering data for use by the processor 100 in locating the appropriate point to access the signal for switching between trick play mode or normal "live" viewing. The navigation data buffer 18 receives information from the encoder 16 regarding markers existing in the signal 12, such as time stamp data, frame length data, marker position data, and the like. This information is forwarded to storage device 30 for use by the processor 100 in determining the access point of the signal when switching between paths A', B' and C, as well as for use by the processor 100 during the trick play modes.

In order to switch from trick play mode display from the second path B' to display of the television signal from the first path A' where a "jump" to the live stream is required, the frame buffer 60 holds a last decoded frame from the second decoder 50. Input to the frame buffer 60 is switched (e.g., at switch 52) from the second path B' to the first path A' to store the next frame from the first path A'. A display 70 then displays the television signal from the first path A'.

Alternatively, when transitioning from trick play mode display from the second path B' to display of the television signal from the first path A', the positioning of the television signal in the trick play mode may approach the time of the live stream. In such a case, the processor 100 determines when a point in the digital data stream providing the trick play mode approaches a corresponding point at which the buffered television signal is being stored based on at least one of the markers. The frame buffer 60 holds a last decoded frame from the second decoder 50 when the point in the digital data stream is at a predetermined distance from the corresponding point at which the buffered television signal is being stored. Input to the frame buffer 60 is switched (e.g., at switch 52) from the second path B' to the first path A' to store the next frame from the first path A'. A display 70 then displays the television signal from the first path.

The markers may comprise at least one of a time stamp, a position indicator, a jump location indicator, a chapter indicator, a flag embedded in the digital signal, a digital watermark, a data tag, or any other type of marker which may be carried in a signal as well known in the art.

As the analog signal 12 is passed through via the first path A' for display on display device 70, without being processed by encoder 16 and second decoder 50, which may be, for example, an MPEG encoder and decoder, the tune-time delay associated with the PVR system is avoided. In addition, a better quality video display is provided via the first path A' as the analog signal 12 is not subject to degradation due to the encoding and decoding processes during "live" viewing via the first signal path A'.

It should be appreciated that the second path B' and the third path C of FIG. 3 are equivalent to the first path A and the second path B, respectively, of the digital embodiment shown in FIG. 1. Therefore, those skilled in the art will appreciate that the invention may be easily implemented in a television appliance capable of receiving both analog and digital television signals (e.g., via a separate receiver/tuner for analog and digital signals).

It should now be appreciated that the present invention provides advantageous methods and apparatus for reducing the tune-time delay in a television or other video appliance having a PVR system. As used herein and in the claims, the term "television" is not meant to be limiting. In particular, the use of all types of video signals and video appliances, including personal computers displaying streaming video, are contemplated in connection with the present invention and intended to be covered by the claims.

Although the invention has been described in connection with various illustrated embodiments, numerous modifications and adaptations may be made thereto without departing from the spirit and scope of the invention as set forth in the claims.

What is claimed is:

1. A method for reducing tune-time delay for television signals in an appliance having trick play mode capabilities, the method comprising:

receiving a television signal at an input of the appliance;

inserting at least one marker into the television signal for marking a position in the signal;

responsive to a channel change request, processing the received television signal via a first signal path including a write buffer for buffering the received television signal, the first signal path bypassing trick play processing for providing an output without trick play modes to a decoder, wherein the first signal path between the input and a display of a decoded signal is without a tune-time delay due to trick play mode processing;

responsive to the channel change request, concurrently processing the received television signal via at least one trick play mode path including the write buffer, a storage device for storing a copy of the television signal buffered in the write buffer and a read buffer for buffering the stored television signal in response to a trick play mode selection for outputting to a decoder;

responsive to the channel change request, initially causing a display of the signal decoded from the write buffer via the first signal path;

in response to a trick play mode request, initiating buffering in the read buffer in the at least one trick play mode path of the stored copy of the television signal from the storage device;

determining a switching location in the television signal for switching the input to the decoder from an output from the write buffer via the first signal path to an output of the read buffer via the at least one trick play mode path, the switching location associated with at least one of the inserted markers; and at the determined switching location, ceasing decoding of the output from the write buffer via the first signal path, and switching the input to the decoder between an output from the write buffer via the first signal path to an output of the read buffer via the at least one trick play mode path, wherein switching the input to the decoder causes a switch in the display of the television signal from the signal processed via the first signal path to the signal processed via the trick play mode path.

2. A method in accordance with claim 1, wherein: said television signal comprises a digital television signal.

3. A method in accordance with claim 2, wherein said processing of said television signal for display via a first path comprises:
buffering the digital television signal; and
decoding the buffered digital television signal for display.

4. A method in accordance with claim 3, wherein said processing of said television signal for PVR trick play mode use comprises:
storing a copy of the digital television signal;
buffering said stored television signal when a trick play mode is selected; and
decoding said buffered television signal to provide said requested trick play mode.

5. A method in accordance with claim 4, wherein switching from said display of said television signal via said first path to display of said trick play mode via said second path comprises:
determining a trick play mode start location in the digital television signal corresponding to a start of a requested trick play mode based on at least one of said markers;
accessing the stored copy of the television signal at the determined trick play mode start location such that said buffering of said stored television signal begins at said determined trick play mode start location;
ending decoding of said television signal from said first path at said determined trick play mode start location; and
beginning decoding of said buffered television signal from said second path at said determined trick play mode start location.

6. A method in accordance with claim 4, wherein switching from trick play mode display from said second path to display of the television signal from said first path comprises:
determining a trick play mode end location in the digital television signal corresponding to an end of a requested trick play mode based on at least one of said markers;
accessing the television signal from the first path at the determined trick play mode end location;
ending decoding of said television signal from said second path at said determined trick play mode end location; and
beginning decoding of said television signal from said first path at said determined trick play mode end location.

7. A method in accordance with claim 6, wherein: said trick play mode comprises one of fast backward, jump backward, or rewind.

8. A method in accordance with claim 4, wherein:
said trick play mode comprises a non-jump-based trick play mode;
said switching from said display of said television signal via said first path to display of said trick play mode via said second path comprises:
completing decoding of a current segment of said digital television signal from said first path;
decoding a next segment of said digital television signal from said first path; and
decoding from said second path successive segments of said buffered digital television signal which follow said next segment of from said first path.

9. A method in accordance with claim 4, wherein switching from trick play mode display from said second path to display of the television signal from said first path comprises:
holding a last decoded frame from said second path in a frame buffer;
decoding the next frame from said first path; and
displaying said television signal from said first path.

10. A method in accordance with claim 9, wherein said trick play mode comprises a jump-based trick play mode.

11. A method in accordance with claim 4, wherein switching from trick play mode display from said second path to display of said television signal from said first path comprises:
determining when a point in the digital television signal providing the trick play mode approaches a corresponding point at which said buffered television signal is being stored based on at least one of said markers;
holding a last decoded frame from said second path in a frame buffer when said point in said digital television signal is at a predetermined distance from said corresponding point at which said buffered television signal is being stored;
decoding the next frame from said first path; and
displaying said television signal from said first path.

12. A method in accordance with claim 1, wherein said trick play modes comprise fast backward, jump backward, rewind, pause, slow motion, and stop.

13. A method in accordance with claim 1, wherein said television signal comprises an analog television signal.

14. A method in accordance with claim 13, wherein said processing of said television signal for display via a first path comprises:
decoding said analog television signal to provide a digital data stream at a first decoder;
providing said digital data stream to a frame buffer; and
outputting the digital data stream from said frame buffer for display.

15. A method in accordance with claim 14, wherein said processing of said television signal for PVR trick play mode use comprises:
encoding said digital data stream from said first decoder;
buffering said encoded digital data stream for storage;
storing said buffered encoded data stream;
buffering said stored encoded data stream when a trick play mode is selected; and
decoding said buffered data stream to provide said trick play mode at a second decoder.

16. A method in accordance with claim 15, wherein switching from said display of said television signal via said first path to display of said trick play mode via said second path comprises:
determining a trick play mode start location in the digital data stream corresponding to a start of a requested trick play mode based on at least one of said markers;
accessing the stored copy of the television signal at the determined trick play mode start location such that said buffering of said stored television signal begins at said determined trick play mode start location;
switching the input to the frame buffer from said first path at said determined trick play mode start location to said second path; and
beginning decoding at said second decoder of said buffered television signal from said second path at said determined trick play mode start location.

17. A method in accordance with claim 15, wherein switching from trick play mode display from said second path to display of said television signal from said first path comprises:
- determining a trick play mode end location in the digital data stream corresponding to an end of a requested trick play mode based on at least one of said markers;
- accessing the decoded digital data stream from the first path at the determined trick play mode end location;
- ending, at said second decoder, decoding of said digital data stream from said second path at said determined trick play mode end location; and
- switching input of said frame buffer from said second path at said determined trick play mode end location to said first path.

18. A method in accordance with claim 17, wherein: said trick play mode comprises one of fast backward, jump backward, or rewind.

19. A method in accordance with claim 15, further comprising:
- providing a third path for said digital data stream to enable non-jump based trick play modes.

20. A method in accordance with claim 19, wherein said switching from said display of said television signal via said first path to display of said trick play mode via one of said second path or said third path comprises:
- marking the current frame position of the digital data stream during said encoding; and
- accessing at said second decoder the digital data stream at the marked position from one of the second or the third path for trick play mode display.

21. A method in accordance with claim 20, wherein:
- the non-jump based trick play mode comprises slow motion;
- the digital data stream is accessed at the marked position from the third path to provide a next frame in the digital data stream; and
- successive frames following the next frame are provided via said second path during slow motion display.

22. A method in accordance with claim 20, wherein:
- the non-jump-based trick play mode comprises pause; and
- a frame located at the marked position is buffered to provide for delayed playback at the termination of pause.

23. A method in accordance with claim 15, wherein switching from trick play mode display from said second path to display of said television signal from said first path comprises:
- holding at said frame buffer a last decoded frame from said second decoder;
- switching input to said frame buffer from said second path to said first path to store the next frame from said first path; and
- displaying said television signal from said first path.

24. A method in accordance with claim 23, wherein said trick play mode comprises a jump-based trick play mode.

25. A method in accordance with claim 15, wherein switching from trick play mode display from said second path to display of said television signal from said first path comprises:
- determining when a point in the digital data stream providing the trick play mode approaches a corresponding point at which said buffered television signal is being stored based on at least one of said markers;
- holding a last decoded frame from said second decoder in a frame buffer when said point in said digital data stream is at a predetermined distance from said corresponding point at which said buffered television signal is being stored;
- switching input to said frame buffer from said second path to said first path to store the next frame from said first path; and displaying said television signal from said first path.

26. A method in accordance with claim 1, wherein said markers comprise at least one of a time stamp, a position indicator, a jump location indicator, a chapter indicator, a flag embedded in the digital signal, a digital watermark, or a data tag.

27. Apparatus for reducing tune time delay for television signals in an appliance having trick play mode capabilities, the apparatus comprising:
- a first signal path for processing a television signal that bypasses trick play processing for providing an output without trick play modes to a decoder, wherein the first signal path between the input and a display of a decoded signal is without a tune-time delay due to trick play mode processing, the first signal path including a write buffer for buffering the received television signal;
- at least one trick play mode path for enabling trick play modes, concurrent to the processing along the first signal path, upon receipt at the input of the appliance the at least one trick play mode path including the write buffer, a storage device for storing a copy of the received television signal, and a read buffer for buffering the stored television signal in accordance with a trick play mode selection;
- a processor responsive to the channel change request for initially causing a display of the signal decoded from the write buffer via the first signal path;
- the processor responsive to a trick mode request for:
  - initiating buffering in the read buffer in the at least one trick play mode path of the stored copy of the television signal from the storage device;
  - determining a switching location in the television signal for switching the input to the decoder from an output from the write buffer via the first signal path to an output of the read buffer via the at least one trick play mode path, the switching location associated with at least one of the inserted markers;
- a switch operatively associated with said processor for switching between a decoding of a first signal processed via one of the paths to a decoding of a second signal processed via a different one of the paths,
- wherein at the determined switching location, the switch is operative to switch the input to the decoder from an output from the write buffer via the first signal path to an output of the read buffer via the at least one trick play mode path, said switching of inputs to the decoder causing a switch in the display of the television signal from the signal processed via the first signal path to the signal processed via the trick play mode path.

28. Apparatus in accordance with claim 27, wherein:
said television signal comprises a digital television signal.

29. Apparatus in accordance with claim 28, wherein said first signal path comprises:
- a first buffer for buffering the digital television signal; and
- a decoder for decoding the buffered digital television signal for display.

30. Apparatus in accordance with claim 29, wherein said second signal path comprises:
- a storage device for storing a copy of the buffered digital television signal;

a second buffer for buffering said stored television signal when a trick play mode is selected; and
said decoder for decoding said buffered television signal to provide said requested trick play mode.

31. Apparatus in accordance with claim 30, wherein, in order to switch from said display of said television signal via said first path to display of said trick play mode via said second path:
said processor determines a trick play mode start location in the digital television signal corresponding to a start of a requested trick play mode based on at least one of said markers;
said second buffer accesses the storage device such that said buffering of said stored television signal begins at said determined trick play mode start location;
said decoder ends decoding of said television signal from said first path at said determined trick play mode start location; and
said decoder begins decoding of said buffered television signal from said second path at said determined trick play mode start location.

32. Apparatus in accordance with claim 30, wherein, in order to switch from trick play mode display from said second path to display of the television signal from said first path:
said processor determines a trick play mode end location in the digital television signal corresponding to an end of a requested trick play mode based on at least one of said markers;
said decoder accesses the buffered television signal from the first path at the determined trick play mode end location;
said decoder ends decoding of said television signal from said second path at said determined trick play mode end location; and
said decoder begins decoding of said buffered television signal from said first path at said determined trick play mode end location.

33. Apparatus in accordance with claim 32, wherein: said trick play mode comprises one of fast backward, jump backward, or rewind.

34. Apparatus in accordance with claim 30, wherein:
said trick play mode comprises a non-jump-based trick play mode; and
in order to switch from said display of said television signal via said first path to display of said trick play mode via said second path:
said decoder completes decoding of a current segment of said digital television signal from said first path;
said decoder decodes a next segment of said television signal from said first path;
said decoder decodes from said second path successive segments of said digital data which follow said next segment of digital data from said first path.

35. Apparatus in accordance with claim 30, wherein, in order to switch from trick play mode display from said second path to display of the television signal from said first path:
said decoder holds a last decoded frame from said second path in a frame buffer;
said decoder decodes the next frame from said first path; and
a display displays said television signal from said first path.

36. Apparatus in accordance with claim 30, wherein said trick play mode comprises a jump-based trick play mode.

37. Apparatus in accordance with claim 30, wherein, in order to switch from trick play mode display from said second path to display of the television signal from said first path:

said processor determines when a point in the digital television signal providing the trick play mode approaches a corresponding point at which said buffered television signal is being stored based on at least one of said markers;
said decoder holds a last decoded frame from said second path in a frame buffer when said point in said digital television signal is at a predetermined distance from said corresponding point at which said buffered television signal is being stored;
said decoder decodes the next frame from said first path; and
a display displays said television signal from said first path.

38. Apparatus in accordance with claim 27, wherein said trick play modes comprise fast backward, jump backward, rewind, pause, slow motion, and stop.

39. Apparatus in accordance with claim 27, wherein said television signal comprises an analog television signal.

40. Apparatus in accordance with claim 39, wherein said first signal path comprises:
a first decoder for decoding said analog television signal to provide a digital data stream;
a frame buffer for buffering said digital data stream prior to display.

41. Apparatus in accordance with claim 40, wherein said second signal path comprises:
an encoder for encoding said digital data stream;
a first buffer for buffering said encoded digital data stream for storage;
a storage device for storing said buffered encoded data stream;
a second buffer for buffering said stored encoded data stream when a trick play mode is selected; and
a second decoder for decoding said buffered data stream to provide said trick play mode.

42. Apparatus in accordance with claim 41, wherein, in order to switch from said display of said television signal via said first path to display of said trick play mode via said second path:
said processor determines a trick play mode start location in the digital data stream corresponding to a start of a requested trick play mode based on at least one of said markers;
said second buffer accesses the stored copy of the television signal at the determined trick play mode start location such that said buffering of said stored television signal begins at said determined trick play mode start location;
input to said frame buffer is switched from said first path at said determined trick play mode start location to said second path; and
said second decoder begins decoding of said buffered television signal from said second path at said determined trick play mode start location.

43. Apparatus in accordance with claim 41, wherein, in order to switch from trick play mode display from said second path to display of the television signal from said first path:
said processor determines a trick play mode end location in the digital data stream corresponding to an end of a requested trick play mode based on at least one of said markers;
said second buffer accesses the decoded digital data stream from the first path at the determined trick play mode end location; said second decoder ends decoding of said digital data stream from said second path at said determined trick play mode end location; and input to said frame buffer is switched from said second path at said determined trick play mode end location to said first path.

44. Apparatus in accordance with claim 43, wherein:
said trick play mode comprises one of fast backward, jump backward, or rewind.

45. Apparatus in accordance with claim 41, further comprising:
providing a third path for said digital data stream from said first buffer to the second decoder to enable non-jump based trick play modes.

46. Apparatus in accordance with claim 45, wherein, in order to switch from said display of said television signal via said first path to display of said trick play mode via one of said second path or said third path:
said processor marks the current frame position of the digital data stream during said encoding; and
said second decoder accesses the digital data stream at the marked position from one of the second or the third path for trick play mode display.

47. Apparatus in accordance with claim 46, wherein:
the non-jump based trick play mode comprises slow motion;
the digital data stream is accessed at the marked position from the third path to provide a next frame in the digital data stream; and
successive frames following the next frame are provided via said second path during slow motion display.

48. Apparatus in accordance with claim 46, wherein:
the non-jump-based trick play mode comprises pause;
a frame located at the marked position is buffered to provide for delayed playback at the termination of pause.

49. Apparatus in accordance with claim 41, in order to switch from trick play mode display from said second path to display of the television signal from said first path:
said frame buffer holds a last decoded frame from said second decoder;
input to said frame buffer is switched from said second path to said first path to store the next frame from said first path; and
a display displays said television signal from said first path.

50. Apparatus in accordance with claim 49, wherein said trick play mode comprises a jump-based trick play mode.

51. Apparatus in accordance with claim 41, wherein, in order to switch from trick play mode display from said second path to display of the television signal from said first path:
said processor determines when a point in the digital data stream providing the trick play mode approaches a corresponding point at which said buffered television signal is being stored based on at least one of said markers;
said frame buffer holds a last decoded frame from said second decoder when said point in said digital data stream is at a predetermined distance from said corresponding point at which said buffered television signal is being stored;
input to said frame buffer is switched from the second path to the first path to store the next frame from said first path; and
a display displays said television signal from said first path.

52. Apparatus in accordance with claim 27, wherein said markers comprise at least one of a time stamp, a position indicator, a jump location indicator, a chapter indicator, a flag embedded in the digital signal, a digital watermark, a data tag.

* * * * *